Nov. 5, 1957 W. H. RYAN 2,811,893
METHOD FOR PRODUCING STEREOSCOPIC PRINTS CONTAINING
IMPROVED LIGHT-POLARIZING IMAGES
AND THE PRODUCT OF SAID METHOD
Filed April 7, 1954 2 Sheets-Sheet 1

INVENTOR
William H. Ryan
BY Broward Mikulka
and Moncure B. Berg
ATTORNEYS

United States Patent Office 2,811,893
Patented Nov. 5, 1957

2,811,893

METHOD FOR PRODUCING STEREOSCOPIC PRINTS CONTAINING IMPROVED LIGHT-POLARIZING IMAGES AND THE PRODUCT OF SAID METHOD

William H. Ryan, Billerica, Mass., assignor to Polaroid Corporation, Cambridge, Mass., a corporation of Delaware Application April 7, 1954, Serial No. 421,495

18 Claims. (Cl. 88—29)

This invention relates to new and improved light-polarizing stereoscopic prints in full color and in black and white, particularly prints which are reproduced from photographic stereoscopic records, and to methods for forming said prints as well as for controlling the appearance in said prints, when viewing, of unwanted densities which give rise to observable ghost images.

Objects of the invention are to substantially eliminate observable but unwanted densities present in at least a first light-polarizing stereoscopic positive image of a stereoscopic pair of light-polarizing, positive, color or black-and-white images which are viewed in superposed relation to each other, and particularly to processes wherein unwanted density is controlled by adding, to either or to both of the light-polarizing positive images of said pair, a weak and light-polarizing negative image of the other light-polarizing positive image of said pair, that is to say, by adding to either or both of said light-polarizing images of said pair a masking image which is a negative of the other image of said pair and which possesses negative density substantially equivalent to the maximum density of a ghost image to be eliminated.

Other objects of the invention reside in the method for producing, from a pair of stereoscopic, photographic, negative image records, a print containing a pair of light-polarizing, stereoscopic positive images by procedure involving the formation of at least a first positive image of a first one of said negative image records as a relief record in at least one relief printing matrix and the formation of a positive image of the second one of said negative image records and also a weak negative image which is a copy of the first one of said negative image records as a relief record in at least a second relief printing matrix, and then by wetting each printing matrix with a solution of a dichroic dye or a dichroic stain and applying each matrix separately in contact with an individual one of a pair of sheets of a transparent, linear, molecularly oriented, high molecular weight, hydroxyl-containing polymer characterized in that one of said sheets has the molecules thereof substantially oriented in a direction opposite to the direction of orientation of the molecules of the other of said sheets and that these two sheets of oriented plastic material are positioned and arranged so that light-polarizing images formed therein are viewable in superposed relation to each other; and to provide methods of the character set forth for producing black-and-white and color prints of a light-polarizing stereoscopic nature.

Further objects of the invention reside in providing as a new product a light-polarizing stereoscopic print carrying at least one pair of light-polarizing stereoscopic images and wherein the print comprises two sheets of a transparent, linear, molecularly oriented, high molecular weight, hydroxyl-containing polymer with the molecules of one sheet oriented oppositely to the direction of orientation of the molecules of the other sheet and with each sheet having dichroic material incorporated in at least one predetermined area thereof to form a predetermined, positive, light-polarizing image of a stereoscopic pair of light-polarizing images and with at least the first of said sheets also having dichroic material incorporated in said predetermined area and forming a predetermined, weak negative copy of the positive light-polarizing image provided in the second sheet; to provide light-polarizing stereoscopic prints of the character described wherein said image-carrying sheets are located on opposite sides of a transparent support; and to provide products of this nature which contain a single pair of light-polarizing images or a multiplicity of pairs of light-polarizing images as in the case of motion picture positive prints and wherein said light-polarizing images are color images or are black-and-white images.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

As heretofore intimated, this invention is concerned with the elimination of ghost images which at times become objectionably apparent to an observer in the viewing of positive, light-polarizing, stereoscopic prints and projections thereof wherein the transmission axes of the images of the observed stereoscopic pair are oppositely oriented and are presented for observation in superposed relation with respect to each other.

Figure 3:
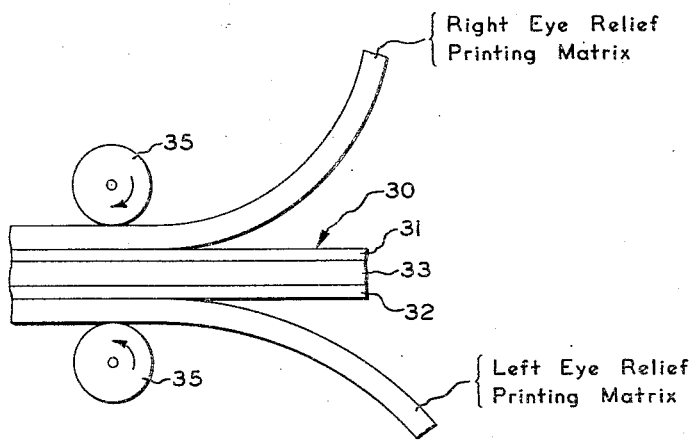
Fig. 3 is a schematic showing of the processing or printing of stereoscopic film stock from a pair of relief matrices.

A suitable medium in which superposed, light-polarizing, stereoscopic, left- and right-eye images may be formed is provided by the stereoscopic film stock 30 illustrated in Fig. 3 as comprising a laminar structure having two thin and transparent surface layers 31 and 32 mounted upon the opposite sides of a transparent support 33. The surfaces layers 31 and 32 are thin sheets of a transparent, molecularly oriented, high molecular weight, hydroxyl-containing polymer of which a preferred example is polyvinyl alcohol, while the support 33 is any suitable transparent and substantially water-impermeable plastic such as cellulose acetate butyrate or cellulose triacetate.

Figure 4:
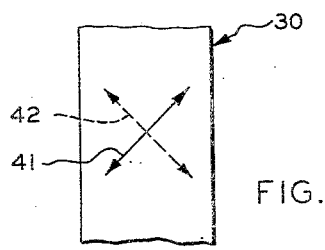
Fig. 4 is a diagrammatic elevation of the stereoscopic film stock from one side thereof.

The layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. A preferred orientation is indicated by the arrows 41 and 42 in Fig. 4, which is a schematic elevation taken from the front face of the film stock 30 and shows the front layer 31 with transmission axis 41 extending upwardly to the right for receiving the right-eye picture of a stereoscopic pair and the rear layer 32 with its transmission axis extending upwardly and to the left for receiving the left-eye stereoscopic picture.

Film structures of this general nature are disclosed in U. S. Patents Nos. 2,289,714, 2,289,715 and 2,315,373. The film stock 30 provides a transparent structure useful as motion picture film or cut film. Additionally, the film stock 30 may be mounted upon an opaque, non-polarizing, reflecting base and used for the formation of light-polarizing reflection prints. Stereoscopic image pairs formed in the film stock 30 will be located in superposed relation to each other.

Image formation in the film stock 30 is carried out by printing with washoff relief matrices in each of which a solution of a suitable dichroic stain or dye has been imbibed. The washoff relief matrices are prepared from photographic originals or duplicates thereof by conventional practices and, after imbibition of a solution of dichroic printing material therein, are pressed into contact with the outer faces of the layers 31 and 32 to transfer portions of said solution to each of said layers. Where the dichroic material becomes adsorbed in a molecularly oriented plastic layer, it renders said layer light-polarizing in nature.

Two sets of printing matrices, one for the right-eye image and one for the left-eye image, are used for the positive reproduction of a stereoscopic pair of images in suitable film stock such as the stock 30. For color positives, each set of matrices comprises two or more individual relief matrices which each bears a positive color separation record of one image of the stereoscopic pair of images to be reproduced. The individual matrices in a set used for color reproduction are printed successively on the stereoscopic film stock. For black-and-white positive reproduction of a stereoscopic image pair, two matrices are employed, one for the left-eye reproduction and the other for the right-eye reproduction of the stereoscopic image to be reproduced, and these matrices, with black-and-white image representations, are individually printed on opposite sides of the stereoscopic film stock. The result of printing with relief matrices in the manner described is to provide, on opposite sides of the film stock 30, positive light-polarizing images having transmission or polarizing axes at right angles to each other.

Viewing is carried out by observing these light-polarizing images through polarizing filters located in front of each eye of the observer with the transmission axes thereof positioned at 90° to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

A suitable dichroic stain comprising iodine for staining molecularly oriented polyvinyl alcohol is set forth in the previously mentioned Patent 2,315,373, while dichroic dyes of a nature suitable for the practice of the invention are set forth in all of the previously mentioned patents. In general, direct cotton dyes are usable as a class for the practice of the invention.

Dichroic stains and black dyes are useful in forming black-and-white light-polarizing images. Full color images, for example of three or more colors, may be provided by the use of cyan, magenta and yellow dyes successively applied to an image-bearing portion of the film stock from individual washoff relief matrices which carry, respectively, red, green and blue separation records of the image of the stereoscopic pair to be reproduced.

By a dichroic stain or dye, there is meant a dye or stain whose molecules possess the property of showing dichroism. In the practice of the invention, this property is displayed when said dyes or stains are incorporated in molecularly oriented plastic materials in that the resultant stained areas show dichroism. The term "dichroism" is used herein to mean the property of differential absorption of the components of an incident beam of light depending upon the vibration directions of said components. Thus, the optical density of each area of a light-polarizing image is a function of the vibration direction of light incident thereon.

Light-polarizing images of the nature described are rendered not only in terms of density difference but in degree of light polarization and have low polarizing efficiency for light areas but high polarizing efficiency for dark areas. When a light-polarizing image is seen through a polarizer the axis of which is parallel to the polarizing axis of the image, it has extremely low contrast or may be totally invisible. Through a polarizer whose axis is at right angles to that of the light-polarizing image, the image is seen at its normal contrast. If the two images are superposed with their axes at 90° to each other and are looked at through a polarizer, ideally, one image only will be visible at maximum contrast with the polarizer in one position, while the other image will be visible only when the polarizer has been rotated 90° from the first-mentioned position.

If an ideal light-polarizing sheet of the nature of layers 31 or 32 were to be observed through an analyzer whose transmission axis is parallel to that of the polarizer, the density (now conventionally designated $d_1$) would be zero. If the analyzer through which this ideal polarizer is viewed were rotated 90°, the density along this axis (now conventionally designated $d_2$) would be infinite. However, actual polarizers differ from this theoretical ideal. For example, in dye polarizers such as are used for the formation of light-polarizing color prints, the desired density $d_2$ varies with wavelength and $d_1$ is a smaller number which also varies with wavelength. The ratio $d_2/d_1$ is called the density ratio, sometimes referred to as the dichroic ratio.

The unwanted light absorption or density $d_1$ for a first image of a light-polarizing stereoscopic pair of images may make that image observable through the analyzer for the second image of the pair since the polarizing axis of the analyzer used for observation of the second image is parallel to the polarizing axis for the first image although it is crossed with respect to the second image. If the degree of this imperfection is sufficiently great, ghost images which are viewable by either or both eyes of an observer become objectionably apparent.

The heretofore mentioned unwanted density $d_1$ of a first image of a stereoscopic pair which becomes visible to the eye of an observer that is intended to see only the second image of the pair is not necessarily objectionable of itself and becomes objectionable only when it appears in contrast to the density $d_2$ or the background of the second image upon which the unwanted density $d_1$ appears to fall. This contrast occurs when an edge of an area of relatively high density $d_1$ which is supposed to be blocked from observation is in fact observable along with an area of relatively low density $d_2$ of the image which is intended to be observed. Under these conditions, it will be appreciated that ghost images will not be present under all conditions employing superposed, light-polarizing, stereoscopic image pairs and will be limited to particular scenes wherein density backgrounds $d_1$ of one image and $d_2$ of the second image appear in overlapped relation.

In general, this undesired condition just described may be substantially eliminated by increasing the density of that image which is intended to be observed by a particular eye only in the areas of said image where the offensive overlapping becomes apparent. More specifically, the invention intends to reduce the appearance of ghost images when viewing stereoscopic pairs of superposed, light-polarizing images to a degree which can be tolerated, if not entirely eliminated, by building into either or both of the light-polarizing images of said pair a weak mask which is a reverse image of the other light-polarizing stereoscopic image of said pair. Since, for observation purposes, each image of a pair of stereoscopic images will be positive images, the mask image built into each image of the pair will be a weak negative image of the other image of said pair.

Some explanation as to the manner in which the stereoscopic originals are formed and the general nature of the taking films used will assist in understanding the procedures of this invention for eliminating ghost images. Stereoscopic photography is commonly carried out by the utilization of two commercially available taking or negative films which are of similar nature and upon one of which there is formed the right-eye image of a scene or an object being photographed and upon the other of which the left-eye image is formed. Following exposure, each taking film is developed and fixed in conventional manner to provide an original negative. The original negatives may be utilized in the preparation of the heretofore mentioned printing matrices or duplicates of them may be made for this purpose. Similarly, the printing matrices may be made from color separation negative records taken from a color negative. Black-and-white taking films are useful for black-and-white stereoscopic reproductions while commercially available color negative films are useful for stereoscopic reproduction in full color.

To add the density to each image of a stereoscopic pair of images needed for ghost image control requires the preparation of a masking image which is used in the formation of an image in a printing matrix.

Figure 1:
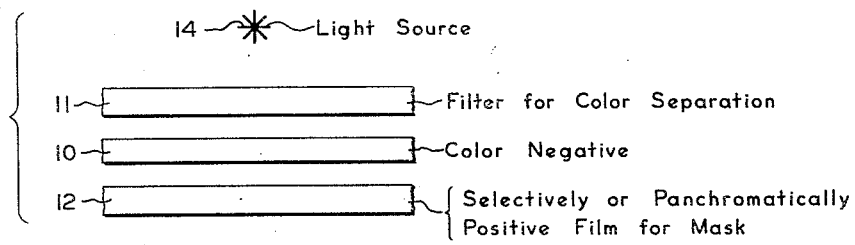
Figure 1 is a schematic showing of procedure for forming a masking image used in preparing a relief printing matrix.

In color work, one practice for forming the masking image is schematically illustrated in Fig. 1 wherein a latent image of a color separation positive is formed in a conventional selectively or panchromatically sensitive black-and-white positive film 12 of low contrast by exposure with light from a conventional source 14 directed through an appropriate color separation filter 11 and a color negative 10 of one image of the stereoscopic pair to be reproduced. Exposure and development of film 12 is controlled to provide a weak positive image of predetermined density. An individual set of positive masks are made for each image of the stereoscopic image pair to be reproduced, each set comprising an individual mask for each color component of the color negative.

Figure 2:
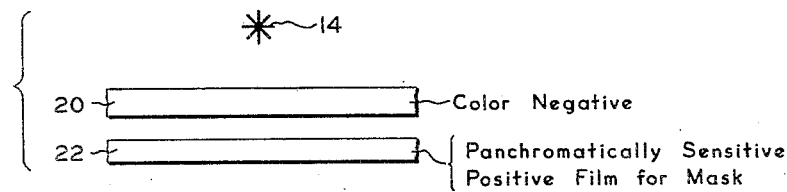
Fig. 2 is a schematic showing similar to Fig. 1 for providing a masking image but utilizing modified procedure.

An alternate practice for forming the weak positive masks is illustrated in Fig. 2 wherein the exposure light from a source 14 is directed through a color negative 20 similar to negative 10 and containing one image of a stereoscopic image pair and onto a black-and-white positive panchromatic film of low contrast. This procedure permits the formation in a single film of a composite positive mask for all color components of one color image of a stereoscopic pair of color images and is advantageous as a means for simplifying the processing needed for the production of a set of printing matrices by the provision of one mask which is usable for the formation of each matrix of the set. As a result, only two weak positive masks need be made, one for one set of printing matrices and the other for the other set of printing matrices.

Figure 5:
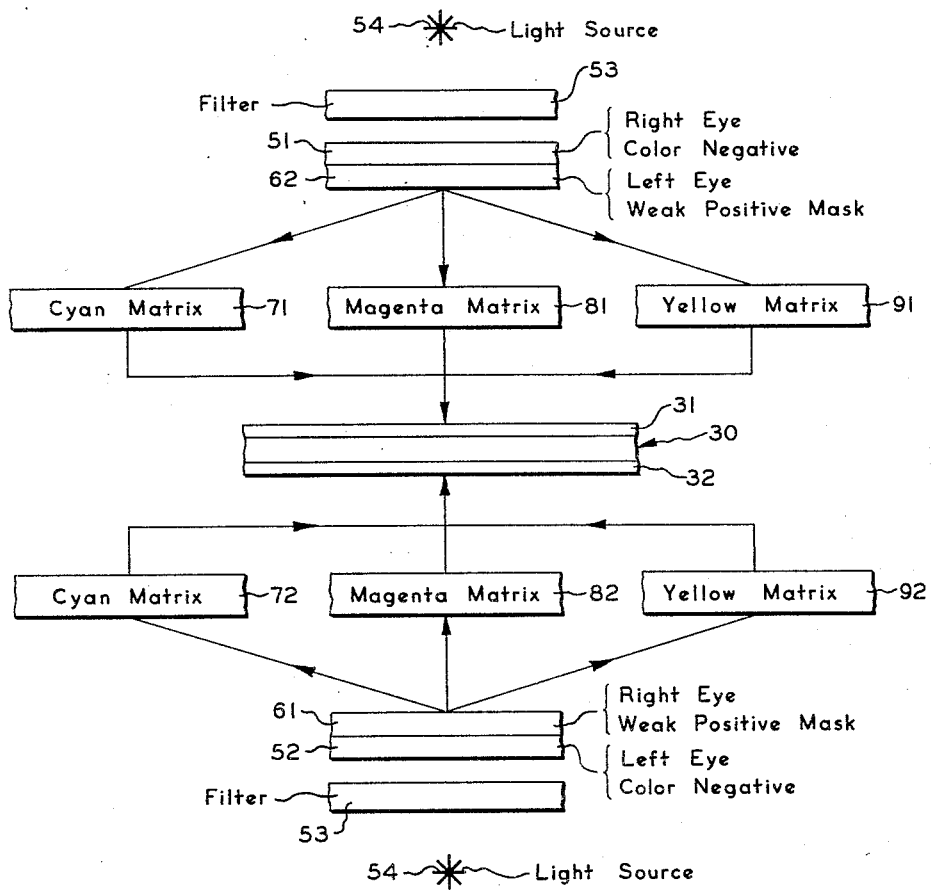
Fig. 5 is a diagrammatic illustration showing the manner of preparing two sets of printing matrices and the manner of application of each set of matrices to the opposite sides of stereoscopic film stock.

Fig. 5 schematically indicates the manner of forming two sets of relief matrices for printing full color, stereoscopic, positive images onto the stereoscopic film stock 30. As therein shown, a set of right-eye printing matrices 71, 81 and 91 for printing the right-eye light-polarizing image is formed by sequentially exposing three conventional washoff relief films through a right-eye color negative 51 to which there is bound a desired left-eye weak positive mask 62. Exposure is by light from a suitable source 54 directed onto the superposed color negative 51 and positive mask 62, through a filter 53 of a color appropriate for separating the desired color component of the color negative 51 which is to be printed on the washoff relief film.

The result of this procedure is to provide in each washoff relief film a latent positive image of a color component of the right-eye color negative 51 and also a weak negative latent image of the left-eye masking image for said color component. Each washoff relief film is exposed and developed in conventional manner to provide a positive gelatin relief which is employed as a printing matrix. For the purpose of illustration, the completed cyan, magenta, and yellow right-eye printing matrices have been respectively indicated in the drawings by the reference numerals 71, 81 and 91.

A set of left-eye printing matrices 72, 82 and 92, respectively representative of the cyan, magenta and yellow components of a left-eye color image 52 of the stereoscopic negative image pair 51, 52, are prepared in a manner similar to that heretofore described for the right-eye printing matrices. In preparing each left-eye printing matrix, a right-eye weak positive mask 61 of the right-eye color negative 51 is bound to the left-eye color negative 52.

The individual printing matrices of each set are utilized for light-polarizing image formation in the film stock 30 in the manner described. For example, the cyan matrices 71 and 72 have a solution of a suitable cyan dye imbibed therein, following which they are respectively pressed into contact with the layers 31 and 32 of the film stock 30 to transfer the dye solution into said layers 31 and 32 and form therein oppositely light-polarizing cyan images. This printing of the film stock 30 with said cyan images is successively followed by printing on the stock with the magenta printing matrices 81 and 82 and then the yellow printing matrices 91 and 92 so that the individual magenta and yellow image components are formed in appropriate registration with the cyan component images contained in the film stock. The order of printing the different color components is immaterial.

A convenient means for simultaneously printing on opposite sides of the film stock 30 is schematically illustrated in Fig. 3 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

Figure 6:
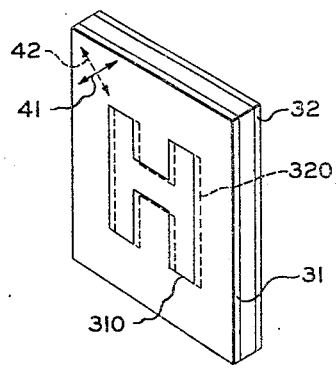
Fig. 6 is a diagrammatic perspective view of a print produced by the procedure of Fig. 5.

A print or product resulting from utilization of the procedures and practices illustrated and described in connection with Figs. 3 and 5 is diagrammatically shown in Fig. 6. Fig. 6 illustrates stereoscopic film stock 30 which contains a right-eye stereoscopic image 310 in the front, molecularly oriented layer 31 and a left-eye stereoscopic image 320 in the rear, molecularly oriented layer 32. Image 31 is shown in full lines while image 32 is shown in dotted lines. For the purposes of simplification, the print shown in Fig. 6 has been considered as derived from a pair of stereoscopic records of the letter H and, in accordance with the processing heretofore described, may be considered as providing a full color stereoscopic print or a black-and-white stereoscopic print.

It will be well understood to the art that practices similar to those previously set forth in connection with the formation of full color, light-polarizing, stereoscopic prints may be utilized for the formation of light-polarizing, black-and-white, stereoscopic image pairs, the primary difference being that it is generally unnecessary to utilize filters in the preparation of either the masking positives or the printing matrices.

As heretofore indicated, all light-polarizing, superposed, stereoscopic images do not give rise to undesired ghost imaging so that practices such as those described herein are usually reserved for the correction of stereoscopic prints of this nature which display this undesired defect. For example, in the case of motion picture film which bears a pair of superposed, light-polarizng, stereoscopic images in each frame thereof, it will under normal conditions be only necessary to determine what frames of the film display objectionable ghost images and to correct only the printing matrices for these frames by the techniques disclosed herein. Printing matrices corrected in this manner are then utilized for the production of motion picture positive release prints.

Reference has been made to the formation of weak positive masks. These masks are intended to be exposed and developed to give a predetermined gamma. A general means for finding the gamma needed by a positive mask may be determined from solution, for the desired gamma, of the following equation:

$$\gamma_1/\gamma_2 = d_2/d_1$$

where $\gamma_1$ is the gamma of the stereoscopic negative to be masked;
$\gamma_2$ is the gamma of the positive mask;

$d_2$ is the maximum density of the light-polarizing image derived from said negative without a mask when observed through an analyzer whose transmission axis is at 90° to that of the polarizing image; and $d_1$ is the unwanted density of the light-polarizing image derived from said negative without a mask when observed through an analyzer whose transmission axis is parallel to that of the polarizing image.

Since the gamma of each negative stereoscopic image or any color component thereof may be easily measured, as is also the case of the densities $d_2$ and $d_1$ of the light-polarizing image formed by the use of said negative, it will be appreciated that the determination of the needed gamma for the positive mask is simply and quickly achieved.

In the production of light-polarizing, superposed images, it will be found that ghost image effects are generally attributable to both light-polarizing images of the stereoscopic pair although at times the appearance of "ghosts" is due solely to one image of the pair. However, in general, where a steresocopic print is corrected for the purpose of reducing ghost image effects, it is mostly desirable to build a mask into each image of the stereoscopic pair so that both images possess similar to overall densities.

It is to be noted that the masking techniques disclosed herein are not only useful for reducing ghost image effects produced when viewing light-polarizing, stereoscopic image pairs which are carried in superposed relation in positive stereoscopic film, but are also useful to control objectionable ghost images in instances where the light-polarizing images of a stereoscopic pair are mounted in side-by-side relation, provided these side-by-side images are viewed upon a screen on which they have been projected in superposed relation to each other.

While I am aware that masking techniques have been used in the printing art in color reproduction and have also been used in color photography for many years, it is to be noted that the color component images of a two-dimensional multicolored image are located in register with each other and that the effect of unwanted absorption is to degrade the faithfulness with which the color of the original subject is reproduced. On the other hand, the images of a stereoscopic pair are not superposed in registered relation so that consequently any extra image resulting from unwanted absorption and observable when viewing the stereoscopic pair becomes both obvious and annoying. In the printing art, black masks have been used to improve contrast, a function entirely different from that of the masks disclosed herein. Again, in color photography, the most conventional type of mask combines a positive of one separation with a negative of another separation, and whereas in the present invention a positive is combined with a negative, they are both representative of the same separation component or of the same combination of separation components.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. In a method for forming a pair of light-polarizing stereoscopic positive images from a prepared pair of stereoscopic photographic negative image records, the steps of forming individual relief printing matrices of which a first of said matrices contains as a relief record at least a positive relief image of a first one of said negative image records and of which a second of said matrices contains as a relief record a positive relief image of a second one of said negative image records and also a weak negative relief image characterized by being a copy of said first one of said photographic records, wetting each relief printing matrix with a solution containing a dichroic material, pressing one of said wetted relief printing matrices into contact with one surface of a sheet of a transparent, linear, high molecular weight, hydroxyl-containing polymer having the molecules thereof substantially oriented in a predetermined direction whereby said dichroic material is caused to transfer from said first one of said wetted relief matrices to the surface of said sheet in contact therewith to form in said sheet a light-polarizing positive image which is a reproduction of the relief record contained in said first printing matrix and pressing the second of said wetted relief printing matrices into contact with a second sheet of a transparent, linear, high molecular weight, hydroxyl-containing polymer of which the molecules thereof are substantially oriented in a direction opposite to the direction of the molecules of said first sheet whereby said dichroic material is caused to transfer from said second one of said wetted relief matrices to the surface of said second sheet in contact therewith to form in said second sheet a light-polarizing positive image and a light-polarizing weak negative image, said images being reproductions of the relief record contained in said second printing matrix, said two sheets of oriented plastic material being so positioned and arranged that said light-polarizing images are viewable in superposed relation to each other.

2. A method as defined in claim 1 for forming a pair of light-polarizing stereoscopic positive images wherein there is included the step of forming in the first one of said matrices a weak negative relief image characterized by being a copy of the second one of said photographic records.

3. A method as defined in claim 1 for forming a pair of light-polarizing stereoscopic images wherein said dichroic material is a dichroic stain comprising iodine.

4. As a new product, a light-polarizing stereosocopic print carrying at least one pair of light-polarizing stereoscopic images, said print comprising two sheets of a transparent, linear, high molecular weight, hydroxyl-containing polymer of which a first of said sheets has the molecules thereof substantially oriented in a predetermined direction and of which the second of said sheets has the molecules thereof substantially oriented in a predetermined direction which is opposite to the orientation of the molecules of said first sheet, each said sheet having dichroic material incorporated in at least one predetermined area thereof and forming a predetermined positive light-polarizing image of a steresocopic pair of light-polarizing images, at least the first of said sheets also having dichroic material incorporated in said predetermined area and forming a predetermined weak negative copy of the positive light-polarizing image provided in said second sheet, said two sheets being so positioned and arranged that said light-polarizing images are viewable in superposed relation to each other.

5. A new product as defined in claim 4 wherein the second of said sheets, in addition to the positive light-polarizing image of said stereoscopic pair, also has a dichroic material incorporated in said predetermined area and forming a predetermined light-polarizing weak negative copy of the positive light-polarizing image provided in said first sheet.

6. A new product as defined in claim 4 wherein the images carried in said sheets are black and white.

7. A new product as defined in claim 4 wherein the images carried in said sheets are in color.

8. A new product as defined in claim 4 wherein said sheets are positioned in superposed relation to each other and are located on opposite sides of a transparent support upon which they are mounted.

9. A new product as defined in claim 8 wherein the images in said sheets are in color.

10. A new product as defined in claim 4 wherein the second of said sheets, in addition to the positive light-polarizing image of said stereoscopic pair, also has a dichroic material incorporated in said predetermined area and forming a predetermined light-polarizing weak negative copy of the positive light-polarizing image provided in said first sheet, and wherein said two sheets are positioned in superposed relation to each other and are located on opposite sides of a transparent support upon which they are mounted.

11. A new product as defined in claim 10 wherein the images in said sheets are in color.

12. A method for effectively eliminating unwanted light-polarizing density in forming at least one of a stereoscopic pair of light-polarizing prints comprising, respectively, a positive light-polarizing right-eye image and a positive light-polarizing left-eye image, said method comprising the steps of placing a sheet of a transparent molecularly oriented material into facing relation with a printing matrix incorporating a relief record of a first of said positive images and a relatively weak negative relief record of the second of said positive images, said printing matrix releasably containing a dichroic printing solution in the areas of said relief records, pressing said matrix and sheet material together to effect an imagewise transfer of said printing solution from said matrix to said sheet material to provide a composite light-polarizing print including both said first positive image and a weak negative image of said second positive image, placing a second sheet of material having a molecular orientation extending in a direction different from that of said first-named sheet into facing relation with a second printing matrix incorporating at least a positive relief record of the second of said positive images and releasably containing a dichroic printing solution in the area of said relief record, and pressing said second sheet material and matrix together to effect an imagewise transfer of said printing solution from said matrix to said sheet material to provide a positive light-polarizing print of said second positive image, the light-polarizing prints being so mutually arranged that the positive image of one is substantially superposed with the positive image of the other.

13. A method as defined in claim 12 wherein said matrices and sheet materials are pressed together substantially simultaneously so that said formation of the prints is performed substantially simultaneously.

14. A method as defined in claim 12 wherein are additionally included the steps of imbibing the printing solutions into the oriented sheet materials by holding the matrices and sheet materials in contact for a given period to form the light-polarizing prints therewithin.

15. A method as defined in claim 12 wherein is additionally included the step of forming a relatively weak negative light-polarizing print of the first positive image in the sheet material employed in forming the second positive print by placing areas of a matrix which contain a negative relief record of said first positive image and a dichroic printing solution against said sheet material and compressing said matrix and sheet material to provide an imagewise transfer of said printing solution to said sheet material.

16. A method as defined in claim 15 wherein said matrices and sheet materials are pressed together substantially simultaneously so that said formation of prints is performed substantially simultaneously.

17. A method for effectively eliminating unwanted light-polarizing density in at least one of a stereoscopic pair of light-polarizing prints comprising, respectively, a positive light-polarizing right-eye image and a positive light-polarizing left-eye image, said method comprising the steps of placing a sheet of a transparent molecularly oriented material into facing relation with a printing matrix incorporating a relief record of a first of said positive images and a relatively weak negative relief record of the second of said positive images, said printing matrix releasably containing a dichroic printing solution in the areas of said relief records, pressing said matrix and sheet material together to effect an imagewise transfer of said printing solution from said matrix to said sheet material to provide a composite light-polarizing print comprising said first positive image and a weak negative image of said second positive image, placing a second sheet of material having a molecular orientation extending in a direction different from that of said first-named sheet into facing relation with a second printing matrix incorporating a positive relief record of at least the second of said positive images and releasably containing a dichroic printing solution in the area of said relief record, pressing said second sheet material and matrix together to effect an imagewise transfer of said printing solution from said matrix to said sheet material to provide a positive light-polarizing print of at least said second positive image, and arranging said prints for viewing purposes so that the positive images thereof are substantially superposed.

18. In a method of forming a stereoscopic pair of light-polarizing multicolor prints from a stereoscopic pair of negative multicolor records of colored subject material and at least a relatively weak positive record of the subject material of one of said negative records, the steps of selectively exposing a first set of photosensitive matrix films through appropriate color filter means and one of said negative color records and a second set of photosensitive matrix film through said filter means and the other of said negative color records, at least one of said second set also being exposed through said weak positive record, processing each of said sets of films to form a first and a second set of individual relief printing matrices, each matrix of said first set comprising a positive relief image of a negative image area of a given color and each matrix of said second set comprising a positive relief image of a negative image area of a given color, at least one of said second set also containing a relatively weak negative relief image of the positive image of said first set, imbibing into each matrix of said first set a dichroic dye of a different color and imbibing a like dye into each matrix of said second set, successively pressing the matrices of said first set in contact with the surface of a sheet of a transparent molecularly oriented material to effect an imagewise transfer of said dye from each said matrix to said sheet material and to provide one of said stereoscopic pair of light-polarizing multicolor prints, successively pressing the matrices of said second set in contact with the surface of a sheet of material having a molecular orientation extending in a direction which is different from that of said first-named sheet to effect an imagewise transfer of said dye from each said matrix to said sheet and thus to provide the other of said stereoscopic pair of light-polarizing multicolor prints and a relatively weak negative print of the first-named multicolor print, and, at a given stage of said method, arranging said sheets in fixed relation to one another so that both said prints of said multicolor pair are superimposed with respect to one another.

(References on following page)

References Cited in the file of this patent

UNITED STATES PATENTS

| | | |
|---|---|---|
| 1,422,527 | Berger | July 11, 1922 |
| 2,135,197 | Norling | Nov. 1, 1938 |
| 2,315,373 | Land | Mar. 30, 1943 |
| 2,674,156 | Mahler | Apr. 6, 1954 |

OTHER REFERENCES

Brown, G. E.: Finishing The Negative, text published by Dawbarn and Ward Ltd., London, 1901, pages 136–140.